April 10, 1934.  G. W. ANDERSON  1,954,764
TIRE BUILDING CORE
Filed Nov. 14, 1931    3 Sheets-Sheet 1

INVENTOR
George W. Anderson
BY Evans & McCoy
ATTORNEYS

April 10, 1934. G. W. ANDERSON 1,954,764
TIRE BUILDING CORE
Filed Nov. 14, 1931 3 Sheets-Sheet 2

INVENTOR
George W. Anderson
BY Evans & McCoy
ATTORNEYS

April 10, 1934.   G. W. ANDERSON   1,954,764
TIRE BUILDING CORE
Filed Nov. 14, 1931   3 Sheets-Sheet 3
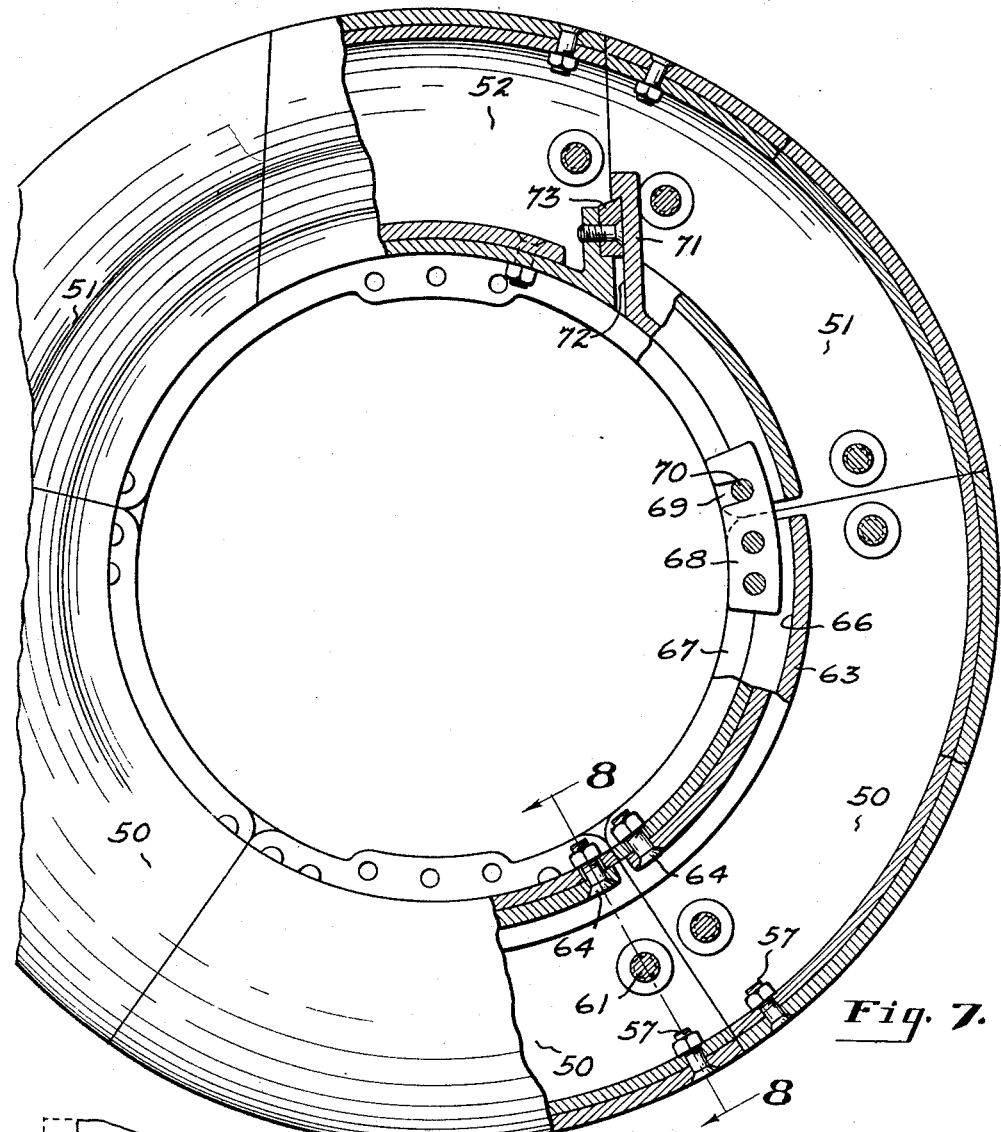
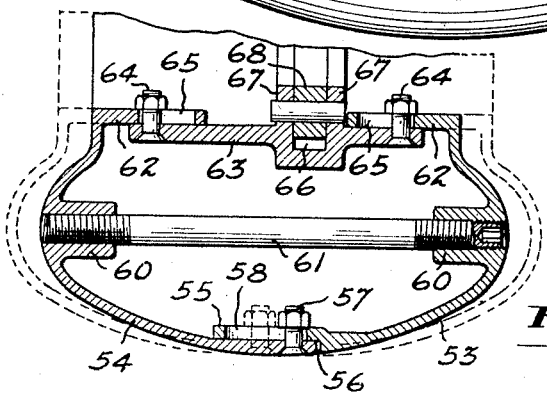
INVENTOR
*George W. Anderson*
BY *Evans & McCoy*
ATTORNEYS Patented Apr. 10, 1934

1,954,764

UNITED STATES PATENT OFFICE 1,954,764

TIRE BUILDING CORE

George W. Anderson, Akron, Ohio, assignor to The General Tire & Rubber Company, Akron, Ohio, a corporation of Ohio Application November 14, 1931, Serial No. 574,989

10 Claims. (Cl. 154—9)

This invention relates to cores for building pneumatic tire casings which are so constructed and mounted that they provide an annular form upon which a tire casing may be built and which are collapsible to permit removal of a tire casing after it has been built upon the core.

The present invention has for its object to provide an annular core which may be adjusted to various widths for building tires of different sizes in transverse cross section.

A further object of the invention is to provide a collapsible tire building core in which the segments of the core are so mounted and connected that the core is collapsible to a space sufficiently small to permit the removal therefrom of tires of the balloon type which have a large cross sectional area and a relatively small internal cross section.

A further object is to provide a mounting for a tire building core of the character above referred to which will permit the core to be quickly and easily collapsed to permit removal of a tire casing after it has been built up thereon.

With the above and other objects in view the invention may be said to comprise the tire building core as illustrated in the accompanying drawings hereinafter described and particularly set forth in the appended claims, together with such variations and modifications thereof which will be apparent to one skilled in the art to which the invention appertains.

Reference should be had to the accompanying drawings forming a part of this specification, in which:

Fig. 7 is a front elevation of a tire building core of slightly modified construction, a portion of the core being broken away and shown in section;

Fig. 8 is a section taken on the line indicated at 8—8 in Fig. 7.

As shown in the accompanying drawings, the tire building core of the present invention is a sectional annulus formed to provide a smooth exterior surface which conforms substantially to the interior of the tire casing to be built up on the core. In order to enable a completed tire casing to be removed from such core, it is necessary that the core be made in sections and be collapsible so that the core can be contracted and removed sufficiently from the interior of the tire casing to permit the tire casing to be taken off the core.

As shown in Figs. 1 to 6 of the drawings the core has a segment 1 which may be termed the base segment which is of somewhat greater arcuate length than the other segments of the core. At opposite ends of the segment 1, short segments 2 are hinged thereto to swing inwardly towards the interior of the core. To the ends of the segments 2 opposite those hinged to the segment 1 a second pair of short segments 3 are hinged, and directly opposite the base segment 1 there is a key segment 4 which fits between the segments 3 and which is slidable between the segments 3 inwardly toward the center of the core, so that it may be moved to a position entirely within a tire casing on its core and clear of the other segments of the core so that the core can be moved laterally away from the key segment and collapsed so as to permit removal of the tire casing.

Figure 1:
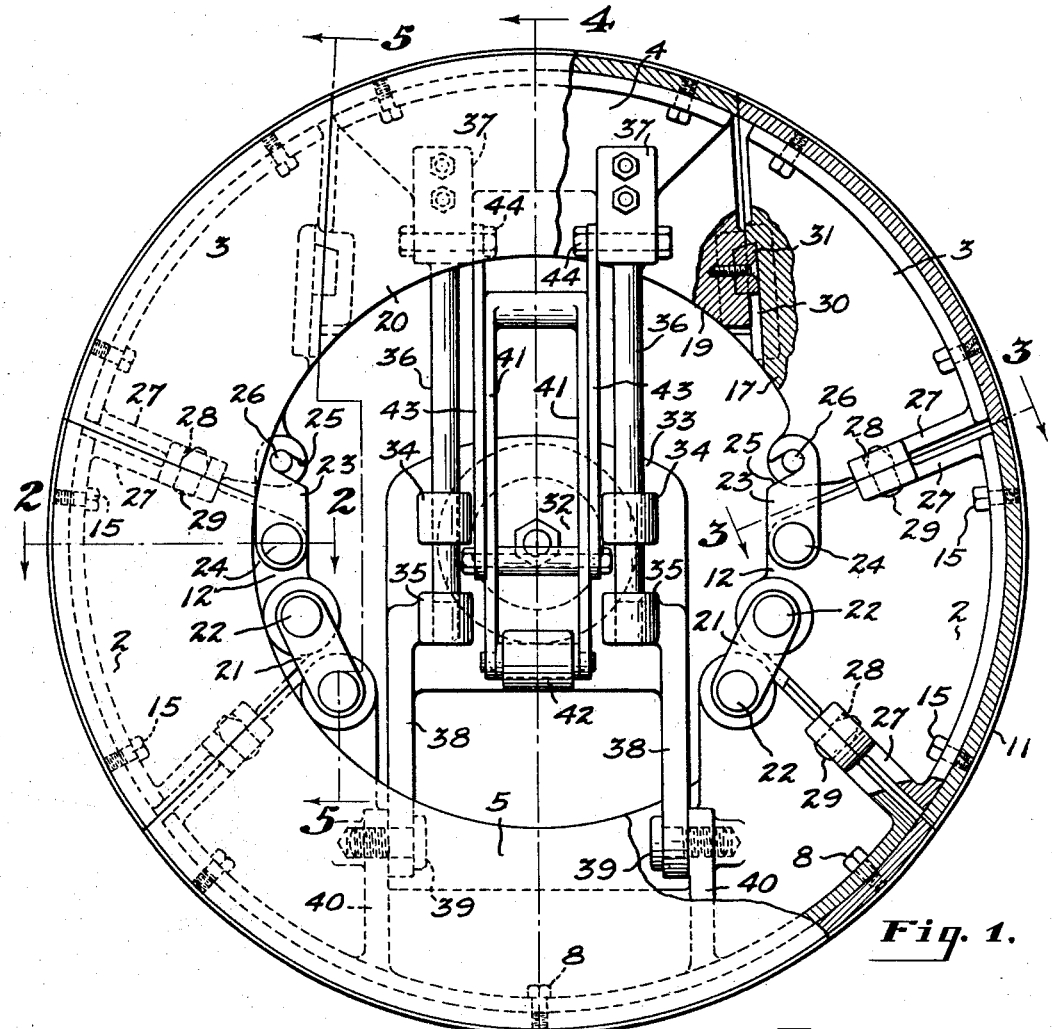
Figure 1 is a front elevation of a collapsible tire building core embodying the invention.
Figure 4:
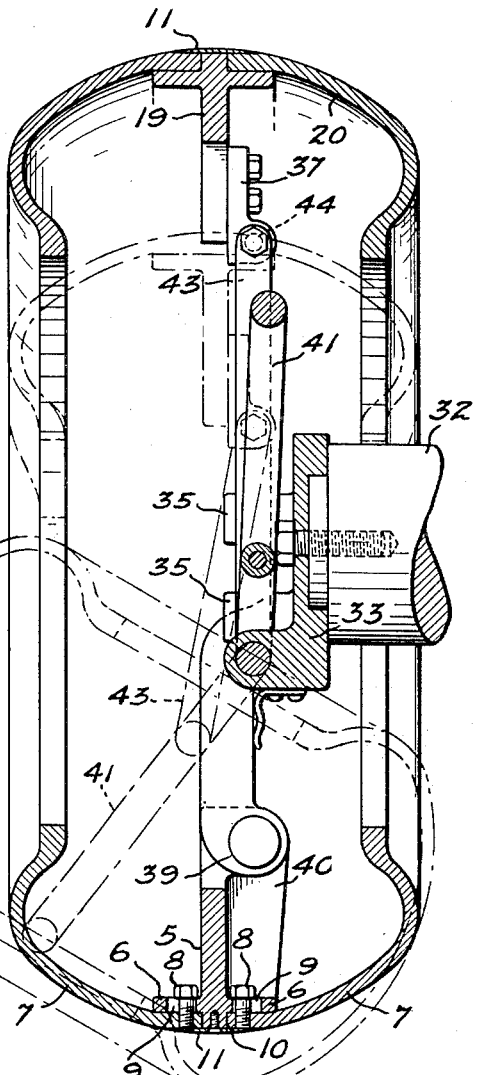
Fig. 4 is a section taken on the line indicated at 4—4 in Fig. 1, showing the core in operative position in full lines, and showing in dotted lines, the key segment in retracted position and the remaining hinge sections of the core swung laterally to a position clear of the key segments and collapsed.
Figure 6:
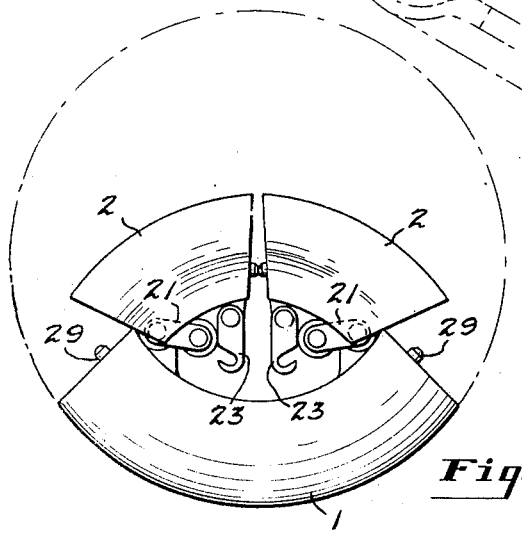
Fig. 6 is a diagrammatic plan view showing the hinged segments of the core collapsed.

As best shown in Figs. 1 and 4 of the drawings, the base section 1 of the tire core has an arcuate centrally disposed supporting bar 5 extending its entire length, the bar 5 being T-shaped in cross section and having its web disposed substantially in the center plane of the core. Near the outer edge thereof the arcuate bar 5 has lateral flanges 6 which serve to adjustably support curved side sections 7 which form the peripheral surface of the core segment and which are secured to the flanges 6 by bolts 8 which extend through the inner edges of the side sections and through laterally extending slots 9 in the flanges 6. Outwardly of the lateral flanges 6, the bar 5 has a short central rib 10 of a height substantially corresponding to the thickness of the inner edges of the curved side sections 7. The side sections 7 are curved to conform to the interior of a tire casing in the form in which it is to be built prior to vulcanization, and by adjusting these side sections on the flanges 6 the width of the core may be increased or decreased. In the narrowest adjustment of the core, the inner edges of the sections 7 are brought against opposite sides of the short rib 10 and the extent to which the core section may be widened is determined by the length of the slots 9. By increasing the width of the core a tire casing of greater cross sectional dimensions may be built thereon.

The adjustment of the sections 7 away from the central rib 10 opens slots between the inner edges of the sections 7 and the central rib 10 which might cause rough lines on the interior of tire casings built up on the core, and to avoid this result a thin sheet metal cover strip 11 of a length corresponding to that of the segment 1 may be attached to the outer edge of the rib 10, the strip 11 being of sufficient width to cover the slots between the ribs 10 and the sections 7 in any position of adjustment of the sections 7.

Figure 2:
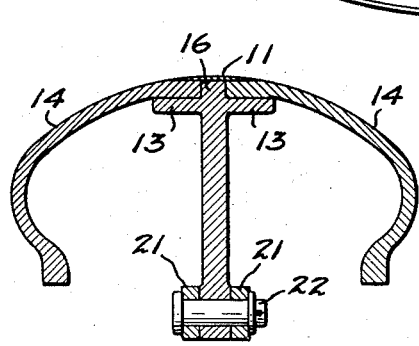
Fig. 2 is a section taken on the line indicated at 2—2 of Fig. 1.
Figure 3:
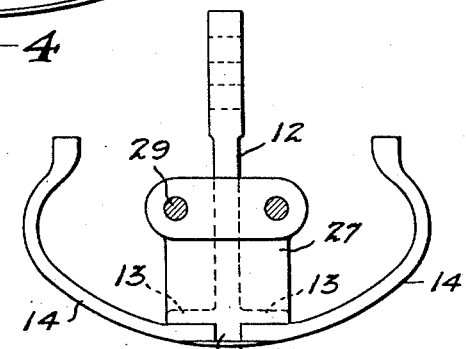
Fig. 3 is a section taken on the line indicated at 3—3 of Fig. 1.

As best shown in Figs. 1, 2 and 3, the segments 2 are each provided with an arcuate T-shaped supporting bar 12 disposed in the center plane thereof and adapted to align with the arcuate bar 5 of the base segment. The bars 12 are also T-shaped and have lateral flanges 13 adjacent their outer edge. Curved side sections 14 corresponding to the sections 7 are adjustably secured by bolts 15 to the lateral flanges 13 and additional sections 11 of the cover strip are attached to the short central ribs 16 to cover the cracks between the inner edges of the side sections and the central ribs of the segments 2.

Figure 5:
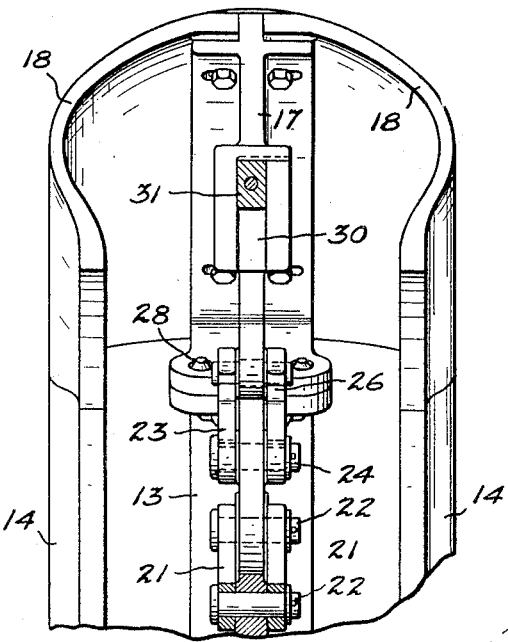
Fig. 5 is a section taken on the line indicated at 5—5 in Fig. 1.

As best shown in Figs. 1 and 5, the segments 3 each have a central arcuate T-shaped supporting bar 17 in circumferential alinement with the supporting bars 5 and 12 and side sections 18 which are mounted on the bar 17 in substantially the same way as the side sections in the segments 1 and 2.

The key segment 4 has a central T-shaped arcuate bar 19 and adjustable side sections 20 which are of substantially the same configuration as the center bar and side sections of the other segments.

As shown in Figs. 1, 2 and 5 the adjoining ends of the arcuate center bars 5 and 12 project inwardly beyond the inwardly projecting edges of the side sections 7 and 14 of the segments 1 and 2 and are connected by short links 21 pivoted at their ends on pivot pins 22 extending through the webs of the bars. The adjoining ends of the arcuate bars 12 and 17 also project inwardly and the segments 2 and 3 are pivotally connected by means of hook links 23 which are pivoted on pins 24 extending through the web of the bar 12 and which have lateral slots 25 adjacent their free ends which receive pins 26 extending through the webs of the bars 17.

At their opposite ends the arcuate center bars 5, 12, 17 and 19 of the core segments are provided with oppositely extending flanges 27 which are disposed at right angles to the webs of the bars to provide faces which abut in radial planes when the segments are assembled. In order to positively hold the segments in circumferential alignment when assembled, the flanges 27 of one abutting segment are provided with apertures 28 while the flanges of the contiguous segment are provided with short pointed dowel pins 29 which fit in the apertures 28 to positively hold the segments against relative, lateral or radial movements. The pointed ends of the dowel pins 29 readily enter the apertures 28 when the segments are swung to operative position and serve to guide the segments into proper registering positions.

To permit the segment 4 to move radially in an inward direction, the flanged ends of the center bars 17 which receive the key segment 4 between them are provided with grooves 30 which receive keys 31 detachably secured to the ends of the center bar 19 of the key section.

As shown in Figs. 1 and 4, the tire building core 80 is mounted upon the end of a shaft 32 which has fixed thereto a hub plate 33 which is provided on its outer face, which extends across the end of the shaft, with two pairs of axially aligned bearings 34 and 35 disposed at equal distances on opposite sides of the axis of rotation. A pair of guide rods 36 are slidably mounted in the aligned bearings 34 and 35 and these rods have at their outer ends heads 37 which are bolted to the web of the center bar 19 of the key section. The guide rods 36 are free to slide in the bearings 34 and 35, and serve to constrain the key section 4 to movement in a straight line in a radial direction toward the axis of the core. The hub plate 33 is provided with spaced integral arms 38 which project into the base segment 1 of the core and which are connected at their ends by pivot bolts 39 to lateral flanges 40 formed integrally with the web of the bar 5 intermediate its ends. A handle 40 is mounted to swing vertically in a plane parallel to the guide rods 36 and between the rods, the handle 40 being pivoted at one end to a bearing lug 42 formed integrally with the plate 33 and projecting outwardly from the face thereof. A pair of links 43 are pivoted at one end to the lever 41 between the longitudinal center thereof and the pivoted end of the lever, the opposite ends of the links 43 being connected by pivot bolts 44 to the heads 37 of the guide rods 36.

As shown in Fig. 4, the handle 41 and links 43 are so disposed with respect to the key section 4 and hub plate 33 that when the handle 41 is in an upright position between the guide rods 36, the pivotal connections between the inner ends of the links 44 and the handle 41 are disposed in dead center or slightly past dead center position between the heads 37 and the bearing lug 42, so as to provide a toggle for holding the key segment in extended position. By grasping the outer end of the handle 41 and swinging the same outwardly, the key section 4 is pulled inwardly in a radial direction to the dotted line position shown in Fig. 4, in which position the key section 4 is clear of the tire carcass and clear of the core segments 3 so that the core is free to swing outwardly about the aligned pivots 39 carrying the tire casing and the hinged sections of the core to a position substantially horizontal and entirely clear of the key segment 4. The segments 3 may then be swung inwardly with respect to the segment 2 and detached therefrom by disengaging the hooks 23 from the pins 26, after which the segments 2 may be swung inwardly to the position shown in Fig. 6 collapsing the core to such an extent that the tire casing can be readily removed therefrom.

By providing short removable and permanently attached hinged segments the core may be collapsed to a much smaller diameter than would otherwise be possible, making it feasible to employ the collapsible core for building tires of large cross section and relatively small diameter.

Referring to the modification of the invention shown in Figs. 7 and 8 of the drawings, the segments which may be of substantially identical construction are detachably and integrally connected together with their abutting ends disposed in radial planes. The core comprises segments 50 which are hinged together and detachably connected to a pair of short segments 51 each of which has one end formed to abut against an adjoining segment 50 in a radial plane and its opposite end formed to abut against a radially movable key segment 52 which is of a form slightly wider at the inner end than at its outer end so that it may be moved inwardly from its position between the segments 51 to a position within the core clear of a tire casing on the core. Each of the core segments is composed of two curved side sections 53 and 54 which are adjustably connected to permit the core to be adjusted to different widths. The sections 53 and 54 are of a shape to conform to the interior of the tire casing to be built up on the core, and the section 53 has an inwardly offset edge 55 at the periphery of the core and an external shoulder 56 which is of a height corresponding to the thickness of the edge of the side section 54 which rests upon the inwardly offset edge 55. The overlapping edges of the side sections 53 and 54 are adjustably joined by means of bolts 57 which extend through the portion of the side section 54 resting on the inwardly offset edge portion 55 of the section 53 and through transverse slots 58 in the edge portion 55.

The side sections 53 and 54 may be provided with inwardly projecting bosses 60 projecting inwardly from the sides of the core at the widest portion thereof and axially aligned. The bosses 60 are internally threaded and adapted to receive a cross rod 61 provided with oppositely inclined threads at its opposite end. One end of the rod 61 may be provided with a recess to receive a suitable tool by means of which the rod may be turned to simultaneously adjust the sections 53 and 54 toward or away from each other to increase or decrease the width of the core.

At the interior of the core the side sections 53 and 54 are provided with inwardly extending flanges 62 and each segment has an arcuate closure plate 63 which is attached to the flanges 62 by means of bolt 64 which extends through transversely extending slots 65 in the flanges 62.

The bolts 57 and 64 serve to clamp the sections 53 and 54 in adjusted positions, and, when the bolts 57 and 64 are loosened, the side sections 53 and 54 may be adjusted toward or away from each other by means of the bolts 64 to obtain the desired width of core, whereupon the bolts 57 and 64 may be tightened to rigidly secure the sections in adjusted position. The closure plate 63 at the interior of the core segments are provided with aligned circumferential channels 66 which open to the interior of the core and with flanges 67 projecting inwardly upon opposite sides of the channel. The segments are positively held in alignment by means of hook plates 68 which are rigidly attached in the channel 66 of one segment and project beyond the segment into the channel 66 of the adjacent segment, the projecting ends of each hook plate being provided with an inwardly opening slot 69 which receives a pivot pin 70 carried by the flanges 67 of the adjacent section. The hook plates 68 are of a size to fit in the channel and serve to maintain the adjacent segments in alignment. The segments 51, at the ends thereof which abut against the key segment 52, are provided with flanges 71 integral with the interior cover plate 63 thereof, and this flange is provided on its face with a groove 72 which receives key 73 secured to the segment 52. The grooves 72 and keys 73 hold the key segment against lateral displacement with respect to the segments 52 and serve to guide the key segment 52 while it is moved inwardly in a radial direction.

This core is further capable of adjustment of its width at the outer periphery without substantially changing the distance between the bead seats, or vice versa, by loosening the fastening bolts at either the interior periphery or the exterior periphery of the core while leaving those at the other periphery tight, then forcing the sections together or apart, by means of the screws 61 or by means of suitable tools when the screws 61 are omitted and then tightening the loosened bolts, the spring of the core metal being sufficient to permit a moderate unequal adjustment of this kind.

As herein illustrated the core has a transversely flattened periphery since it has been found to be advantageous to initially form tire casings with a transversely flattened tread portion and with the interior of the casing having a contour corresponding to that of a flattened core such as shown.

The present invention provides a core for the building of pneumatic tire casings of the same diameter but of different rated cross sections and thus reduces the amount of core equipment required for building such tires. It further facilitates the building of experimental tires to determine the proper cross-section, or for slightly varying the internal dimensions of tires whose walls are of different thicknesses due to the numbers of plies of fabric reinforcement or the arrangement of the reinforcement.

It will also be apparent that the collapsible core of the present invention is one capable of being collapsed within a tire casing of relatively small diameter and relatively large cross-sectional area.

Furthermore, it is to be understood that the particular form of apparatus shown and described, and the particular procedure set forth, are presented for purposes of explanation and illustration and that various modifications of said apparatus and procedure can be made without departing from my invention as defined in the appended claims.

What I claim is:

1. An annular tire core composed of sections relatively adjustable in an axial direction to vary the width of the core, and fastening devices located substantially at the inner and outer peripheries of the core for fixing said sections at different adjustments.

2. An annular tire core comprising a hollow body and inner ring transversely divided into segments, each segment having an opening to the interior of the annulus and being longitudinally divided into sections relatively adjustable in an axial direction to vary the width of the core, and fastening means accessible from the interior opening of the several segments for securing the body sections together at their outer peripheries and for securing the body sections at their inner peripheries to the inner ring segments at different adjustments.

3. An annular tire core comprising an inner ring and a hollow body transversely divided into segments, each segment having an opening to the interior of the annulus and being longitudinally divided into side sections telescoping at the outer periphery to vary the width of the core, and separately attached at the inner periphery to the inner ring segments, and fastening means accessible through the interior opening of the segments for securing the body sections together at their outer periphery and for securing them at their inner periphery to the inner ring segments at different adjustments.

4. An annular tire core comprising an inner tongue ring and a core body transversely divided into segments, the body being longitudinally divided into sections relatively adjustable in an axial direction to vary the width of the core, transverse screw means connecting said body sections between their inner and outer peripheries for adjusting the core width, means at the outer periphery for fastening the body sections together at the different adjustments, and means at the inner periphery for fastening said body sections at the different adjustments to the inner ring segments.

5. An annular tire core composed of sections relatively adjustable in an axial direction in unequal amounts at the inner and outer peripheries to vary the width of the core, and means for separately fastening said segments at the two peripheries.

6. An annular tire core comprising a segmental inner ring, a segmental core body thereon longitudinally divided into sections which overlap at the outer periphery, said sections being relatively adjustable in an axial direction and in equal or unequal amounts at the outer and inner peripheries to vary the width of the core, fastening means for securing the sections together at the outer periphery, and additional fastening means for separately securing the sections to the inner ring at the inner periphery.

7. An annular tire core divided into segments, one of said segments being a key segment and abutting adjoining sections in planes diverging toward the center of the core, each of said sections comprising an arcuate central supporting bar having a web disposed substantially in the center plane of the core and lateral flanges adjacent its outer periphery, and curved side sections having edge portions secured to said flanges for lateral adjustment thereon.

8. An annular tire core divided into segments, one of said segments being a key segment and abutting adjoining sections in planes diverging toward the center of the core, each of said sections comprising an arcuate central supporting bar having a web disposed substantially in the center plane of the core and lateral flanges adjacent its outer periphery, and curved side sections having edge portions secured to said flanges for lateral adjustment thereon, said supporting bars being disposed end to end in abutting relation and having lateral flanges at the ends thereof to provide abutting faces.

9. An annular tire core divided into segments, one of said segments being a key segment and abutting adjoining sections in planes diverging toward the center of the core, each of said sections comprising an arcuate central supporting bar having a web disposed substantially in the center plane of the core and lateral flanges adjacent its outer periphery, and curved side sections having edge portions secured to said flanges for lateral adjustment thereon, said supporting bars being disposed end to end in abutting relation and having interengaging parts for holding the core segments in alinement.

10. The combination with a supporting shaft having a hub plate at an end thereof, of a collapsible core carried by said hub plate which comprises a base segment hinged to said hub plate to swing about an axis transverse to the shaft, a key segment diametrically opposite the base which is mounted to slide radially on the hub plate, segments hinged to the opposite ends of the base segment and segments detachably connected to said hinged segments and engaging opposite ends of the key segment, and means carried by the hub plate for moving said key segment inwardly to a position clear of the other segments of the core.

GEORGE W. ANDERSON.